United States Patent

[11] 3,551,638

| [72] | Inventor | Elvin L. Campbell<br>P.O. Box 51, St. Francisville, La. 70775 |
|---|---|---|
| [21] | Appl. No. | 803,790 |
| [22] | Filed | Mar. 3, 1969 |
| [45] | Patented | Dec. 29, 1970 |

[54] FAIL-SAFE SYSTEM FOR DIRECT CURRENT WELDING MACHINES
5 Claims, 2 Drawing Figs.

| [52] | U.S. Cl. | 219/134 |
|---|---|---|
| [51] | Int. Cl. | B23k 9/10 |
| [50] | Field of Search | 219/132, 133, 134; 322/69 |

[56] References Cited
UNITED STATES PATENTS

| 1,728,403 | 9/1929 | Finch | 322/69X |
|---|---|---|---|
| 2,140,351 | 12/1938 | De Croce | 219/132X |
| 3,402,341 | 9/1968 | Cook | 219/132X |

*Primary Examiner*—J. V. Truhe
*Assistant Examiner*—George A. Montanye
*Attorney*—Lewis R. Krieg ABSTRACT: A control system for a DC welding machine is provided, permitting control by the operator at a point remote from the generator, i.e., at the welding station or position. Means adjacent or associated with the electrode holder permit discontinuance, by volition or by "fail-safe" operation, of welding potential, whereby inadvertent electric shock and flash can be eliminated.

PATENTED DEC 29 1970

3,551,638

INVENTOR.
ELVIN L. CAMPBELL
BY
ATTORNEY 3,551,638

FAIL-SAFE SYSTEM FOR DIRECT CURRENT WELDING MACHINES

BACKGROUND OF THE INVENTION

This invention relates to direct current or DC welding apparatus. More specifically, the invention is a control system for remote control operation, whereby the operator can discontinue or initiate welding voltage being supplied by an operating machine without leaving his position at the electrode holder. Hazards heretofore associated with welding operations are thereby avoided at will.

Direct Control welding machines include a primary or a welding generator capable of delivering large currents at moderate voltage. A typical welding current range is 200—300 amperes at 40 to 100 volts.

The cables from the welding generator include a ground cable, terminating in a clamp to be attached to the work piece, and an electrode cable. The electrode cable terminates in an electrode holder, having a spring-loaded jaw set for gripping a welding rod. In normal operation, with voltage being supplied by the generator, the operator deliberately strikes an arc for welding purposes.

In practice, the welding cables are fairly long, and the operator works at positions remote from the machine. While such remoteness is essential for flexibility and versatility, it gives rise to certain hazards as detailed below.

It is necessary for the operator to start the machine and set the controls at the desired position before moving to the work position, this movement usually being while carrying the charged electrode holder at the end of the cable. As movement of the operator in such periods is without the normal eye protection afforded by the welding mask, any arcing occurring is dangerous in exposing the welder's eyes to painful and possibly permanent burn damage. Frequently, movement from and to the work is through confined and tortuous passages, so that the likelihood of inadvertently striking an arc, by touching some metallic object with the electrode, is increased.

A similar hazard occurs when the operator is adjusting his position in cramped work quarters, or inspecting or planning his work.

In addition to the above described danger of inadvertent "flash," an associated hazard is referred to as electric shock or "bite." This occurs when the operator inadvertently exposes himself as a conductor to the welding voltage. This is likely to occur when electrodes are being changed, and especially when the operator's clothing is damp or the surrounding environment is damp, as in marine work. While electric "bite" is not likely to be seriously harmful per se, it causes involuntary muscular reaction, so that the welder is likely to lose his balance. This can, of course, be very hazardous when the welding is being done in a high or exposed position.

Means have not been heretofore provided whereby the above hazards could be avoided. In Anderson U.S. Pat. No. 2,964,681, a circuit system is disclosed, providing for initiating welding voltage by a switch at the electrode holder handle. The Anderson device, however, does not permit the operator to interrupt welding current flow, except by breaking the welding arc.

SUMMARY OF THE INVENTION

The object of the invention is to provide a remote control system for DC welding generators of the type including a field winding and an exciter generator for supplying current to said field winding. More particularly, the object is to provide a remote control system whereby welding voltage can be discontinued or initiated from the normal welding position, i.e., at or near the end of the welding cable. A further object is to provide said control without circuit breakers or switches in the welding current circuit.

As noted, the present invention is a system for control of generator sets having an exciter generator for energizing the field coil winding of the principal generator. In machines of this type, the exciter is customarily mounted on the same shaft as the rotor of the main generator. The power for driving the machine is usually provided by a gasoline or similar internal combustion engine, provided with a governor to attain substantially constant speed operation.

Generally, the control system includes a control circuit including direct current source, a control switch, a relay winding and relay, a switch in the exciter generator circuit, said switch being activated by the said relay in response to opening or closing the control switch of the control circuit.

The direct current source of the control circuit can conveniently be the battery of the drive engine customarily used, as explained above, but a separate battery can, of course, be used. The switch of the control circuit can be a simple, spring loaded, normally open type. In the preferred embodiments, the switch is of the known type which can be locked in open or closed position, or positioned to open automatically when closing pressure is released. As is explained hereafter, this provides the operator with a "fail-safe" type of control when desired.

DRAWINGS

The principles of the invention and the details of construction and operation will be understood from the detailed description following, and by reference to the drawings, which include:

FIG. 1, which is a schematic illustration of one embodiment of the invention; and FIG. 2, illustrating a further embodiment of the invention.

DETAILED DESCRIPTION

Figure 1:
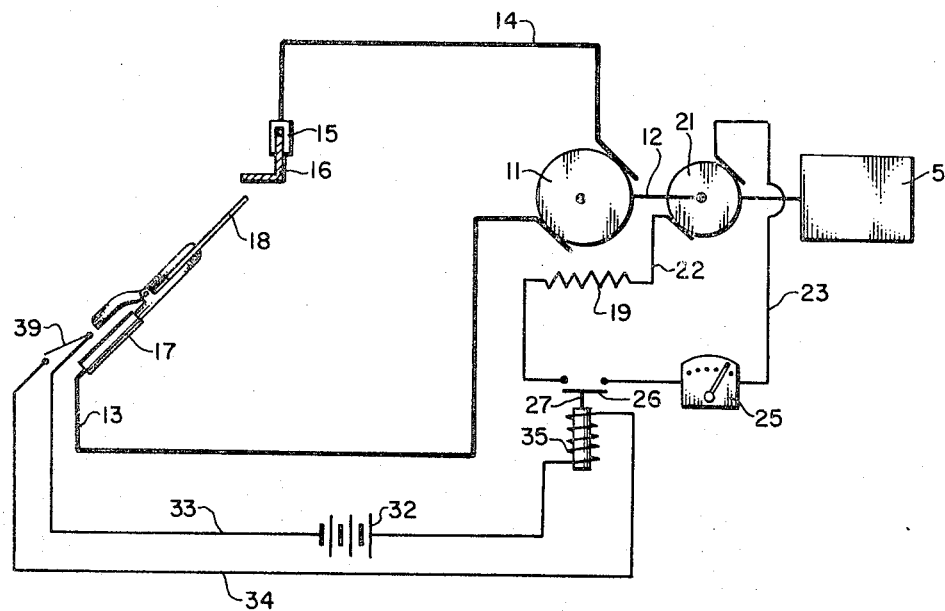

Referring to FIG. 1, a main or primary generator 11 and a supplemental generator or exciter 21 are connected together by the shaft 12, which is driven by a gasoline engine 5 as a prime mover. Welding cables 13, 14 transmit the current generated to an electrode 18 gripped by the clamp jaws of an electrode holder 17. Ground cable 14 terminates in a clamp 15 for attaching to the work piece 16. During welding, an arc is maintained between the electrode 18 and the work piece 16.

The exciter 21 generates current for the field winding 19 of the generator 11, when the circuit thereto is closed. The circuit includes leads 22, 23, a switch 26, and rheostat 25.

The control circuit includes leads 33, 34 and the control switch 39, shown in open position. The switch is desirably mounted on the handle 17 of the electrode holder. Included in the circuit is a direct current source 32 which, suitably, can be also the battery for the drive engine 5. Also part of the circuit is a winding 35 of a relay 27 operatively connected to the switch 26 in the exciter circuit.

When the switch 39 is closed the relay 27 is energized, closing switch 26 and completing the exciter circuit. The field coils 19 of the generator 11 are thus energized and a welding voltage is thus established to the cables 13, 14. When the control circuit is opened by the switch 39, the exciter circuit is broken by opening of the switch 26, and voltage generation by the generator 11 is immediately terminated.

During welding current generation the output curve of the generator 11 is determined by the setting of the rheostat 25 as conventionally supplied in the exciter circuit.

The circuit wires 33, 34 are of small gage compared to the welding circuit cable 13. They can thus be taped to the cable 13, or, alternatively, a three conductor cable can be used, one being the heavy conductor for the welding current and the other two being the control circuit leads.

The switch 39 is desirably mounted on the electrode holder handle 17 but this mounting is not absolutely essential. If desired, the switch may be provided with a clip or pin means for securing to the clothing or the belt of the welding operator.

Positioning the switch 39 on the electrode holder handle 17 is preferred because it is particularly adapted to provide a "fail-safe" functioning of the control system. The switch 39 is provided with a spring loaded open position as indicated. By positioning on the handle 17, closure can be accomplished by gripping the handle 17 in the normal manner for welding. By releasing this grip, the control circuit is automatically opened, thus causing discontinuance of the welding current.

In the most preferred form, the control switch 39 is of the construction having three positions, viz., lock open, lock closed, and spring loaded open. This provides the greatest utility and versatility of the control system. In the lock open switch position, for example, there is no opportunity for the welding voltages to be established, even by deliberate gripping of the handle. Furthermore, if the operator is moving from one position to another there is no possibility of the welding voltage being generated in response to accidental bumping of the switch. In the position with the switch spring loaded open, gripping the handle in the normal operating position will establish the welding voltage and release will discontinue the voltage. Lastly, with the switch in the lock closed position, the welding voltage will not be terminated without deliberate action by the operator.

In a further embodiment, the control circuit is modified so that the primary control current is reduced to a very low level, so that the size of the conductors associated with the welding cable is further reduced. This modification is schematically illustrated by FIG. 2, with only portions of the conventional elements of the welding machine shown more fully by FIG. 1.

Figure 2:
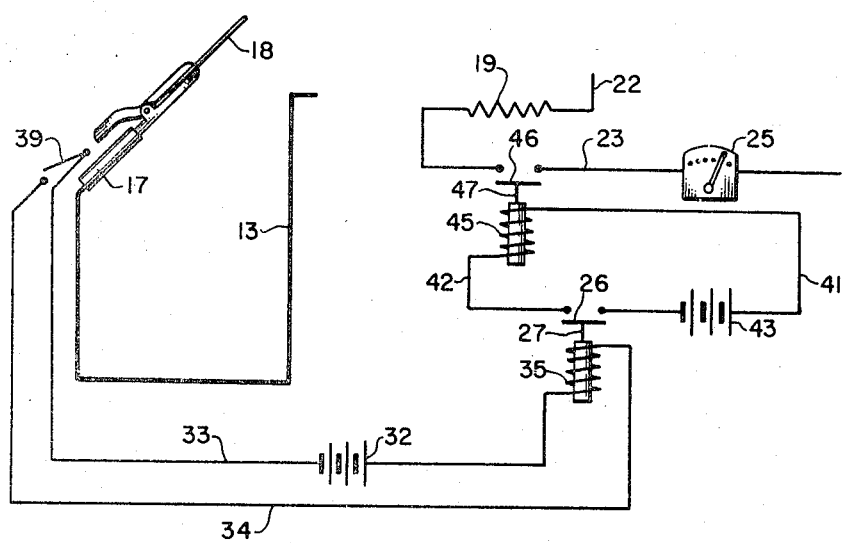

Referring to FIG. 2, the control circuitry includes two segments, the primary segment including the switch 39, leads 33, 34, a direct current source 32, and a relay winding 35. The secondary circuit includes leads 41, 42 and a direct current source 43. If desired this direct current source can be the same as the source 32 for the primary control circuit. Also included in the secondary circuit is a switch 26, closable by the action of the relay 27 in response to energizing of the winding 35 of the primary circuit. A relay winding 45 completes the secondary circuit, for activating the relay 47 for closing the switch 46 in the exciter circuit.

Upon completing the primary circuit by closing the control switch 39, the switch 26 in the secondary control circuit is closed in response to energizing the relay winding 35. In turn, the winding 45 is energized and the exciter circuit is completed by closure of its switch 46, whereupon welding voltage generation is initiated. Opening of the control switch initiates the reverse sequence, discontinuing the welding voltage.

By means of the improved circuitry of the embodiment of FIG. 2, the current of the primary control circuit is as low as 100 milliamps, but provides full control of a welding current of as high as 300 amperes at a voltage of up to 100 volts.

I claim:

1. In combination, an electric welding apparatus having an elongated cable terminating in a welding electrode holder, and a generator of the high-current, moderate-voltage type for supplying direct current to said cable, said generator having a field circuit, and a remotely controlled fail-safe system for discontinuing the generator output automatically except when the system is set to permit generation of welding current, said fail-safe system including a field circuit switch having an open and a closed position in the generator field circuit, and a fail-safe circuit for controlling said field circuit switch, said fail-safe circuit including a relay connected to said field circuit switch to operate said field circuit switch, an electric power source for energizing said relay, a two-position switch, and electrical conductor means connecting the relay, electric power source and two-position switch, the two-position switch being located adjacent the welding electrode holder and spring loaded in a first position for opening of the fail-safe circuit with the resultant operation of the relay to open the said field circuit switch, and manually movable to the second position for closing the said fail-safe circuit with the resultant operation of the relay which closes the said field circuit switch, whereby the generator field circuit is completed and the generator output occurs only when the two-position, spring-loaded switch is in the position opposed by the spring loading.

2. The apparatus of claim 1 further defined in that the two-position, spring-loaded switch in the fail-safe circuit is spring loaded open, and the relay is connected to close the said field circuit switch when energized.

3. In combination, an electric welding apparatus having an elongated cable terminating in a welding electrode holder, and a generator of the high-current, moderate-voltage type for supplying direct current to said cable, said generator having a field circuit, and a remotely controlled fail-safe system for discontinuing the generator output automatically except when the fail-safe system is set to permit generation of welding current, said fail-safe system including:

a field circuit switch having an open and a closed position in the generator field circuit;

a primary fail-safe circuit including:
  a first relay connected to a two-position switch in a secondary fail-safe circuit hereafter defined, for closing said switch when energized,
  an electric power source for energizing said first relay when the primary fail-safe circuit is closed,
  a spring-loaded-open, manually closable switch adjacent the welding electrode holder, and
  electrical conductor means connecting the first relay, electric source and spring-loaded-open, manually closable switch, and a second fail-safe circuit including:
  a second relay connected to the said field circuit switch to close said switch when the second relay is energized,
  a further electric power source for energizing said second relay when the secondary fail-safe circuit is closed,
  a two-position switch operatively connected to said first relay, and
  further electrical conductor means connecting the second relay, the further electric power source, and the two-position switch, whereby the generator field circuit is completed only when the said spring-loaded switch is closed and the primary and secondary fail-safe circuits are completed.

4. A remotely controlled fail-safe system for a direct current welding apparatus having a generator of the high-current, moderate-voltage type having a field circuit, said apparatus having an elongated cable terminating in a welding electrode holder, the fail-safe system including a field circuit switch having an open and a closed position in the generator field circuit, and a fail-safe circuit including a relay connected to said field circuit switch, an electric power source for energizing said relay, a two-position switch and electrical conductor means connecting the relay, electric power source and two-position switch, the two-position switch being spring loaded in a first position for opening of the fail-safe circuit with the resultant operation of the relay which opens the said field circuit switch, and manually movable to the second position for closing the said fail-safe circuit with the resultant operation of the relay which closes the said field circuit switch, whereby said field circuit is completed only when the spring-loaded switch is in the position opposed by the spring loading.

5. The fail-safe system of claim 4 further defined in that the switch in the fail-safe circuit is spring-loaded open, and the relay is connected to close the said field circuit switch when energized.